US012808237B2

(12) United States Patent
Szegeny et al.

(10) Patent No.: US 12,808,237 B2
(45) Date of Patent: Nov. 24, 2026

(54) DRIVE UNIT FOR MOTOR-VEHICLE APPLICATIONS

(71) Applicant: KIEKERT AG, Heiligenhaus (DE)

(72) Inventors: Peter Szegeny, Engelskirchen (DE); Michael Scholz, Essen (DE); Holger Schiffer, Meerbusch (DE)

(73) Assignee: KIEKERT AG, Heiligenhaus (DE)

( * ) Notice: Subject to any disclaimer, the term of this patent is extended or adjusted under 35 U.S.C. 154(b) by 324 days.

(21) Appl. No.: 18/689,228

(22) PCT Filed: Aug. 19, 2022

(86) PCT No.: PCT/DE2022/100623

§ 371 (c)(1),
(2) Date: Mar. 5, 2024

(87) PCT Pub. No.: WO2023/036366

PCT Pub. Date: Mar. 16, 2023

(65) Prior Publication Data

US 2024/0376753 A1 Nov. 14, 2024

(30) Foreign Application Priority Data

Sep. 9, 2021 (DE) ..................... 10 2021 123 331.3

(51) Int. Cl.
*E05B 81/06* (2014.01)
*E05B 81/14* (2014.01)
(Continued)

(52) U.S. Cl.
CPC .............. *E05B 81/06* (2013.01); *E05B 81/14* (2013.01); *E05B 81/28* (2013.01); *E05B 81/42* (2013.01)

(58) Field of Classification Search
CPC .......... E05B 81/06; E05B 81/14; E05B 81/28; E05B 81/42; E05B 81/44
(Continued)

(56) References Cited

U.S. PATENT DOCUMENTS 5,240,296 A * 8/1993 Kobayashi .............. E05B 81/25 292/201
5,676,003 A * 10/1997 Ursel ...................... E05B 81/42 292/201
(Continued)

FOREIGN PATENT DOCUMENTS

CN 1340126 A * 3/2002 ............. E05B 81/14
CN 114466964 A * 5/2022 ............... E05B 1/42
(Continued)

OTHER PUBLICATIONS

International Search Report mailed Oct. 4, 2022, for priority International Application No. PCT/DE2022/100623.

*Primary Examiner* — Kristina R Fulton
*Assistant Examiner* — James Edward Ignaczewski
(74) *Attorney, Agent, or Firm* — Renner, Otto, Boisselle & Sklar LLP

(57) ABSTRACT

A drive unit for motor-vehicle applications, comprising an electromotive drive and an actuation rod which is mounted, at one end, on the drive and is acted upon by the drive. The drive acts eccentrically on the actuation rod, wherein for this purpose a drive cam of the drive engages in a drive cut-out of the actuation rod. Moreover, a guide cam, which engages in a guide cut-out in the actuation rod, is provided. The drive cam and the guide cam are arranged at a drive wheel of the electromotive drive. According to the invention, the electromotive drive has at least one evoloid gear stage.

19 Claims, 2 Drawing Sheets

(51) Int. Cl.
*E05B 81/28* (2014.01)
*E05B 81/42* (2014.01)

(58) Field of Classification Search
USPC .......................................................... 292/201
See application file for complete search history.

(56) References Cited

U.S. PATENT DOCUMENTS

| | | | | |
|---|---|---|---|---|
| 2016/0356065 | A1* | 12/2016 | Schiffer | E05B 81/44 |
| 2020/0115932 | A1* | 4/2020 | Ottino | E05B 81/01 |
| 2023/0167660 | A1* | 6/2023 | Tomaszewski | E05B 77/28<br>70/278.7 |
| 2023/0279703 | A1* | 9/2023 | Riess | E05B 83/28<br>70/277 |
| 2024/0376752 | A1* | 11/2024 | Szegeny | E05B 85/02 |
| 2025/0163732 | A1* | 5/2025 | Taurasi | E05B 81/86 |

FOREIGN PATENT DOCUMENTS

| | | | | | |
|---|---|---|---|---|---|
| CZ | 202325 | A3 | * | 8/2024 | E05B 85/04 |
| DE | 19737996 | A1 | | 4/1998 | |
| DE | 19944968 | A1 | | 6/2001 | |
| DE | 10319952 | A1 | * | 11/2004 | E05B 81/14 |
| DE | 102009036834 | A1 | * | 2/2011 | E05B 15/1635 |
| DE | 102013216328 | A1 | | 5/2014 | |
| DE | 102017125819 | A1 | * | 5/2019 | E05B 81/34 |
| DE | 102019116441 | A1 | | 12/2020 | |
| DE | 102019119876 | A1 | | 1/2021 | |
| DE | 102020101362 | A1 | | 7/2021 | |
| EP | 2163715 | A1 | * | 3/2010 | E05B 81/14 |
| JP | 2004052263 | A | * | 2/2004 | |
| KR | 20250017400 | A | * | 2/2025 | E05B 79/16 |
| WO | 2015024555 | A1 | | 2/2015 | |
| WO | 2021013309 | A1 | | 1/2021 | |
| WO | 2021148081 | A1 | | 7/2021 | |

* cited by examiner

DRIVE UNIT FOR MOTOR-VEHICLE APPLICATIONS

This application is a national phase of International Patent Application No. PCT/DE2022/100623 filed Aug. 19, 2022, which claims priority to German Patent Application No. 10 2021 123 331.3 filed Sep. 9, 2021, each of which is hereby incorporated herein by reference in its entirety.

FIELD OF DISCLOSURE

The invention relates to a drive unit for motor-vehicle applications, having an electromotive drive, and having an actuation rod mounted at one end on the drive and acted upon by it, wherein the drive operates eccentrically on the actuation rod and, for this purpose, a drive cam of the drive engages in a drive cut-out in the actuation rod, wherein further a guide cam engaging in a guide cut-out in the actuation rod is provided, and wherein the drive cam and the guide cam are arranged on a drive wheel of the electromotive drive.

BACKGROUND OF DISCLOSURE

Drive units for motor-vehicle applications are used in a variety of ways. These include, for example and not limited to, closing and/or opening apparatuses for motor vehicle doors, as described in detail in WO 2015/024555 A1. With the help of such a closing apparatus, a vehicle flap, a vehicle side door, a hood, etc. can be closed, for example, from a pre-closed position in a main closed position against the force of a circumferential rubber door seal. Such a drive unit can also generally be used to realize an opening apparatus for opening such a flap, hood or side door.

Another use case for motor-vehicle drive units is described in DE 197 37 996 A1. Here, the drive unit ensures that a closing wedge carrier is displaced linearly with the help of the electromotive drive. The wedge interacts in a known manner with a motor vehicle door latch, which in turn is mounted in or on a motor vehicle door. In this manner, a motorized closing aid can be implemented.

In addition to the described applications of such a drive unit for motor-vehicle applications as an opening or closing aid of an associated motor vehicle flap, motor vehicle hood, motor vehicle side door, etc., such drive units can of course also be used in other manners. For example, a drive unit in such a manner can also be used in conjunction with a window regulator, as a mirror adjuster, seat adjuster, etc. Furthermore, applications inside a motor vehicle latch are conceivable and are expressly comprised in such a manner that the drive unit is used to electrically open a locking mechanism consisting of a catch and a pawl.

All of the use cases described are characterized by the fact that the electromotive drive is typically operated with a low DC voltage of 12 V, for example, which is available in the motor vehicle and is therefore limited in terms of its power. In practice, this is taken into account by using a downstream gearbox or a special design of the actuation rod to increase the torque on the output side of the electromotive drive in order to realize and convert the described closing and opening processes, which may require high forces. This requires considerable design effort in some cases.

For this reason, the generic prior art according to DE 10 2019 119 876 A1 uses an actuation rod that is actuated by means of a double cam arrangement. This is because the actuation rod is acted upon by the drive cam and also the guide cam. This reduces the overall design effort. At the same time, the drive cam can be used to transmit high torques to the actuation rod as required, because this torque ultimately depends on the point of contact of the relevant drive cam in the drive cut-out and the direction of force between the drive cam and the actuation rod determined in this manner. The realized torque can therefore also be specified variably depending on the geometric design. The additional guide cam always ensures that the actuation rod is guided and returned correctly at the same time.

Neither a spring nor additional guide means or rail guides are required. This is because the design with the two cams in connection with the associated cut-outs means that the actuation rod is guided play-free or almost play-free. This has proven to be fundamentally successful.

A comparable and likewise generic prior art is described in EP 2 163 715 A1. In this case, too, a double-cam controlling of an actuation rod is used to open the locking mechanism of an associated motor vehicle latch.

The prior art has proven itself in principle, but still offers room for improvement. Thus, the known drive unit opens up the possibility of being able to actuate an actuation rod with perfect guidance and, within certain limits, variable torque. However, there are still requirements in practice that aim to further reduce the design effort and also the number of parts and thus the weight of such a drive unit. In fact, the drive wheel, which has a double cam design, is usually driven via several gear stages with the help of an electric motor. These multiple gear stages ensure that the high-speed rotations of the drive motor are reduced as part of the drive unit and that the required torque is available at the drive wheel. This is structurally complex.

SUMMARY OF DISCLOSURE

The invention is based on the technical problem of further developing a drive unit in such a manner that the design effort is further reduced compared to the prior art.

In order to solve this technical problem, the invention proposes that the electromotive drive in a generic drive unit for motor-vehicle applications has at least one evoloid gear stage.

As a rule, only a single evoloid gear stage is realized. This is advantageously located between a worm on a drive shaft of an electric motor and the drive wheel. In other words, according to the invention, the drive unit for motor-vehicle applications is reduced solely to the electric motor with the worm on its drive shaft and the drive wheel, which has the two cams. This provides a particularly compact design that is also layered to provide enormous torques on the output side of the actuation rod, which were previously not considered possible with such a compact design.

This can be substantially attributed to the fact that at least one or the only evoloid gear stage is realized at this location between the worm on the drive shaft of the electric motor and the drive wheel. Such an evoloid gear stage opens up the possibility of a large ratio spread. In fact, such an evoloid gear stage can be used to provide a reduction ratio of 10 to 1, 20 to 1, particularly even 30 to 1 and more. This means that in the example of a reduction ratio of 30 to 1, 30 revolutions of the electric motor drive shaft and consequently of the worm located on the drive shaft are reduced to just 1 revolution of the drive wheel. In principle, even higher reduction ratio values of up to 50 to 1 or even more are possible and are comprised by the invention. All of this is achieved with the help of the single evoloid gear stage, i.e. by meshing the worm on the drive shaft of the electric motor with the drive wheel. Consequently, a high torque is available at the drive wheel, which is transmitted play-free or almost play-free to the actuation rod using the two cams, without the need for additional springs for resetting, further guides, etc. These are the main advantages.

In detail, the design is such that the drive wheel has inclined evoloid teeth on its outer circumference in relation to its axis of rotation. These inclined evoloid teeth therefore define a circumferential evoloid toothing of the drive wheel. The worm also has several involute teeth, which are beveled in such a manner that at least one evoloid tooth can always engage with the outer circumferential involute teeth of the drive wheel.

An embodiment in which the screw is equipped with a maximum of three evoloid teeth on the circumferential side and in its longitudinal extension has proven to be particularly favorable. These maximum three evoloid teeth are again beveled in such a manner that at least one of these three evoloid teeth always engages with the outer circumferential evoloid teeth of the drive wheel.

The design of the two cams on the drive wheel is generally such that the guide cam and the drive cam are designed at an acute angle to one another and with the same axis. It has also proven useful in this context if the guide cam, the drive cam and the drive wheel are designed as a one-piece plastic component, particularly an injection-molded plastic part. This not only provides a particularly weight-optimized and corrosion-free design, but also allows the torque transmitted from the drive cam to the actuation rod to be varied as required, depending on the acute angle between the guide cam and the drive cam. For the reasons already described at the beginning, this ultimately depends on how the direction of force designed by the drive cam at the point of contact in the associated drive recess is oriented in relation to the actuation rod.

Furthermore, it has proven to be advantageous if the screw and the actuation rod are also each designed as a plastic component and particularly as a plastic injection-molded part. This once again provides a corrosion-free and weight-optimized design, which can furthermore be manufactured in a particularly cost-effective and precise manner.

It has proven to be particularly advantageous if the electromotive drive unit is arranged in a dry room housing part of a drive housing. Such an embodiment is particularly recommended in the event that the electromotive drive unit is a component of a motor vehicle latch and particularly a motor vehicle door latch. In this case, the drive housing is designed as a latch housing.

Typically, such a latch housing is designed in two parts with the aforementioned dry room housing part and a wet room housing part. The wet room housing part usually contains a locking mechanism consisting substantially of a catch and a pawl as further components of the motor vehicle latch. The arrangement of the electromotive drive unit in the drying chamber housing part ensures that the individual components of the electromotive drive, which are advantageously made predominantly of plastic, are protected both from moisture and from the ingress of dirt, dust, etc. This is because the dry room housing part of the drive housing or latch housing is regularly hermetically sealed against the environment and thus against moisture, dirt and dust. This also ensures that the electromotive drive functions perfectly, even over long time scales, as well as low-friction operation.

The subject matter of the invention is also a motor vehicle latch and, in particular, a motor vehicle door latch, which is equipped not only with the previously mentioned locking mechanism consisting substantially of a catch and a pawl, but also with the drive unit mentioned and described in detail. In this case, the drive unit or the electromotive drive may provide what is known as electrical opening of the locking mechanism. This means that the actuation rod acts directly or indirectly on the pawl when the locking mechanism is closed and ensures that the pawl is lifted from its latching engagement with the catch. As a result, the catch can open spring-assisted and release a previously trapped locking bolt. The associated motor vehicle door can be opened.

In principle, however, the electromotive drive inside the motor vehicle latch and particularly the motor vehicle door latch can also be used for other motorized actuations, for example to actuate an actuating lever mechanism in such a manner that the actuating lever mechanism is transferred from a "locked" functional position to an "unlocked" functional position, for example. Other functional positions such as "theft-proof/theft-deterrent" and "child-proof/child-resistant" can also be realized and converted with the help of the electromotive drive and the correspondingly designed operating lever chain inside the motor vehicle latch. These are the main advantages.

BRIEF DESCRIPTION OF DRAWINGS

In the following, the invention is explained in more detail with the aid of a drawing showing only an exemplary embodiment; in the figures.

DETAILED DESCRIPTION

Figure 1:
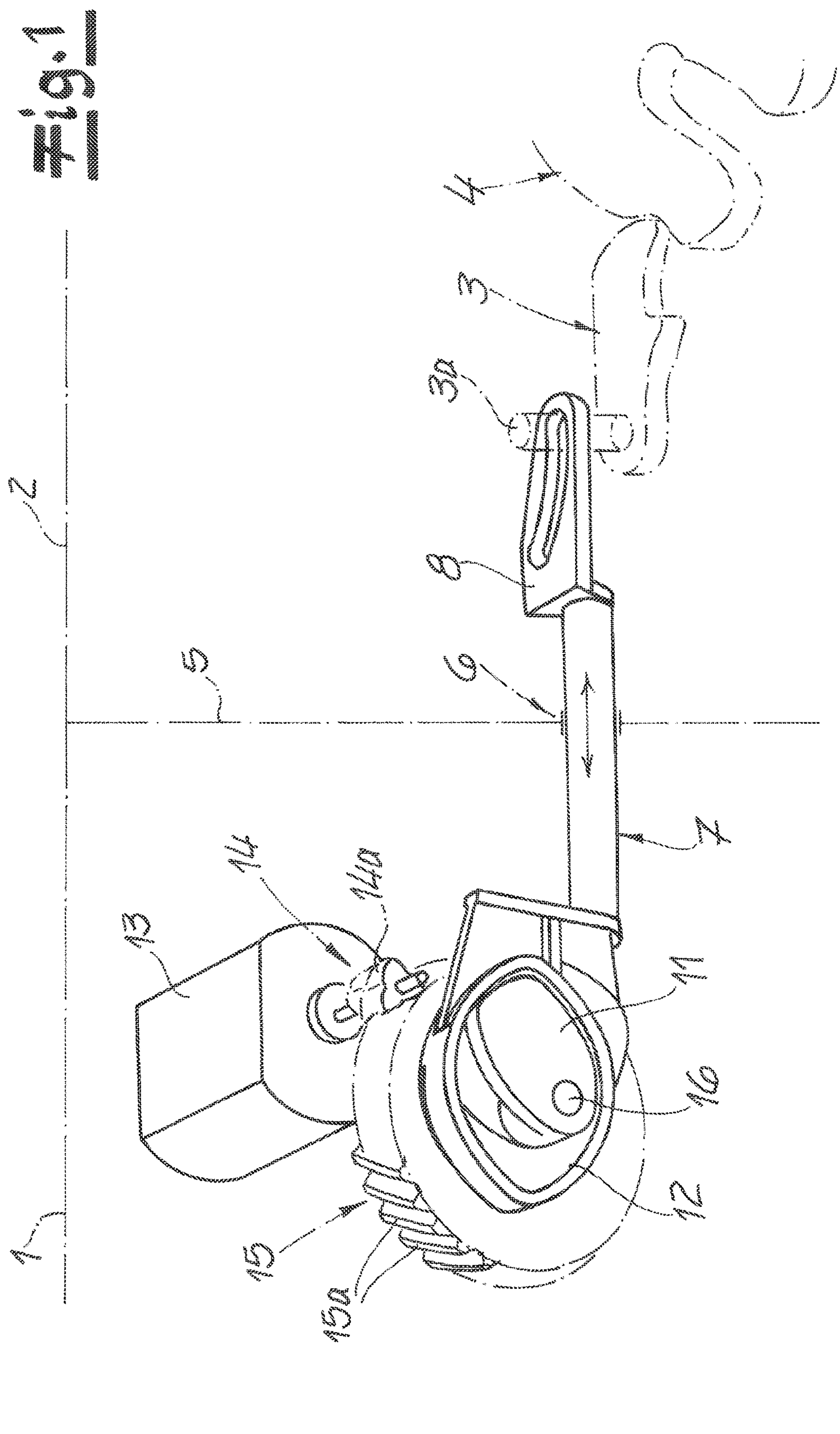
FIG. 1 shows the drive unit according to the invention in a perspective view and FIGS. 2A and 2B show the double-cam arrangement in detail.

In the drawings, a drive unit for motor vehicle applications is shown. According to the exemplary embodiment, the drive unit is not restrictively a component of a motor vehicle latch and in particular a motor vehicle door latch, of which a latch housing 1, 2 can be seen in FIG. 1 and very schematically. According to the exemplary embodiment, the latch housing 1, 2 is composed of a dry room housing part 1 and a wet room housing part 2. A locking mechanism 3, 4 consisting substantially of catch 4 and pawl 3 is arranged in the wet room housing part 2, which are shown in their closed state in the exemplary embodiment in FIG. 1. It can also be seen that the dry room housing part 1 is separated from the wet room housing part 2 by a dividing wall 5, which only has a through-opening 6 for an actuation rod 7 to be described in more detail below. The actuation rod 7 can perform the longitudinal movements indicated in FIG. 1, wherein the through-opening 6 is additionally equipped with a seal, not shown, in order to separate the dry room housing part 1 from the wet room housing part 2 and prevent the ingress of any moisture, dust or dirt.

In fact, the actuation rod 7 belongs to an electromotive drive 7, 8, 9, 10, 11, 12, 13, 14, 15. It can be seen that the electromotive drive 7 to 15 is equipped with an electric motor 13, which has a worm 14 on its drive shaft. The worm 14 meshes with an outer circumferential toothing of a drive wheel 15. For its part, the drive wheel 15 is equipped with a drive cam 9, which engages in a drive recess 10 of the actuation rod 7. Furthermore, the drive wheel 15 also has a guide cam 11, which engages in a guide cut-out 12 of the actuation rod 7. Finally, the electromotive drive 7 to 15 also includes a cantilever 8 connected to the actuation rod 7 with an associated cut-out in which a pivot 3*a* of the pawl 3 engages.

The drive 7 to 15 works eccentrically on the actuation rod 7. This allows the actuation rod 7 to perform the linear movements shown in FIG. 1 in its longitudinal direction. As a result of this, the pawl 3 can be rotated about its axis and thus lifted from its latching engagement with the catch 4 shown in FIG. 1, so that the locking mechanism 3, 4 is opened electrically or by an electric motor.

According to the invention, the electromotive drive 7 to 15 shown is equipped with at least one evoloid gear stage 14*a*, 15*a*. According to the exemplary embodiment, a single evoloid gear stage 14*a*, 15*a* is realized in the electromotive drive 7 to 15, namely between the worm 14 on the drive shaft of the electric motor 13 and the drive wheel 15. For this purpose, the drive wheel 15 has evoloid teeth 15*a* on its outer circumference. The evoloid teeth 15*a* are inclined relative to an axis of rotation 16 of the drive wheel 15.

The screw 14 is also equipped with several evoloid teeth 14*a*. The evoloid teeth 14*a* are beveled in such a manner that at least one of these evoloid teeth 14*a* always engages in the outer circumferential evoloid teeth of the drive wheel 15. The exemplary embodiment shows that the screw 14 is equipped with a maximum of three evoloid teeth 14*a* on the circumferential side and in its longitudinal extension.

Figure 2B:
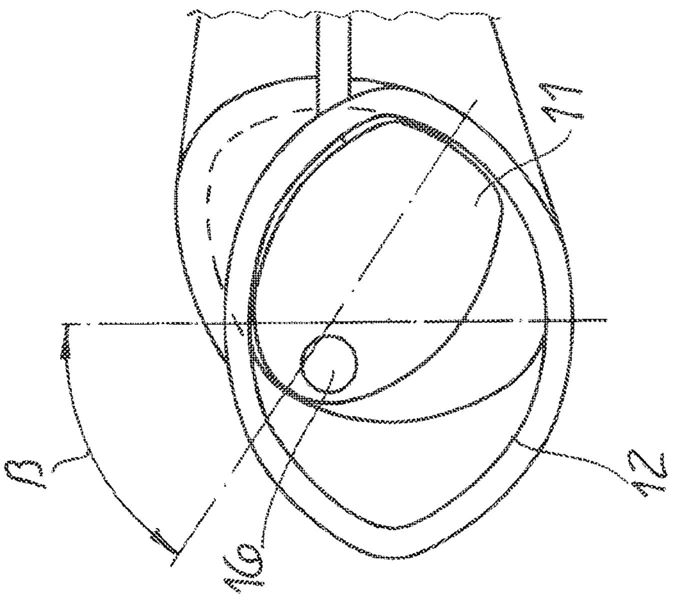
Figure 2A:
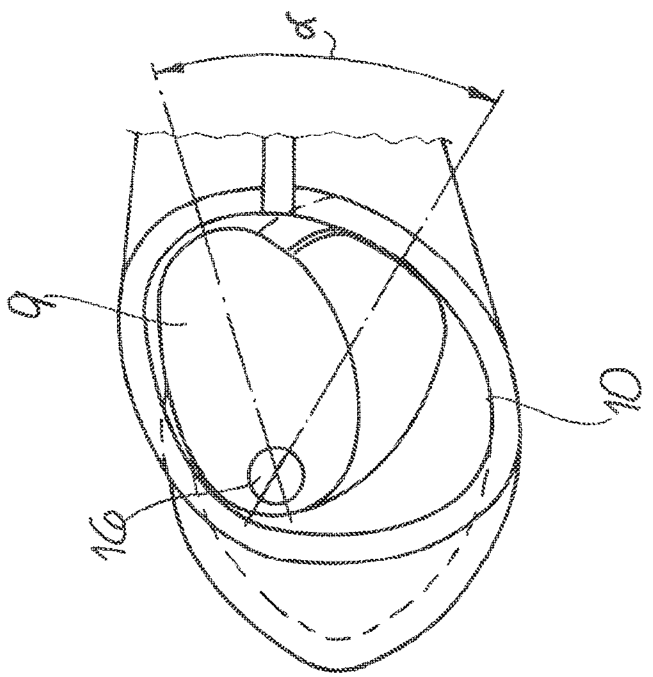

The guide cam 11 and the drive cam 9 are arranged at an acute angle to one another according to the exemplary embodiment, as can be seen from FIGS. 2A and 2B. In fact, the acute angle α shown in FIG. 2A is realized at this point between the two cams 9, 11. In addition, the two cams 9, 11 are designed to be axially aligned with one another, namely the axis of rotation 16 of the drive wheel 15 is used as the common axis.

According to the exemplary embodiment, the guide cam 11, the drive cam 9 and the drive wheel 15 define a one-piece or integral plastic component 9, 11, 15. The plastic component 9, 11, 15 in question is designed as a plastic injection molded part according to the exemplary embodiment. The screw 4 and the actuation rod 7 including the cantilever 8 are also each designed as plastic components, particularly injection-molded plastic parts. This enables particularly cost-effective production and ensures that the evoloid teeth 14*a*, 15*a*, which are consequently also made of plastic, and the evoloid gear stage 14*a*, 15*a* realized in this manner operate with particularly low friction. In addition, the fact that the electromotive drive 7 to 15 is predominantly arranged in the dry room housing part 1 and the actuation rod 7 only passes through the through-opening 6 as the only opening of the dry room housing part 1 as shown in the representation in FIG. 1 in order to be able to interact with the locking mechanism 3, 4 in the wet room housing part 2 as described ensures largely wear-free operation.

FIG. 2A shows that the two cams 9, 11 are arranged at an acute angle to one another and enclose the angle α between them, which can advantageously assume values between 20° and 60°. In addition, the drive cam 9 is elliptically designed according to the exemplary embodiment, while the guide cam 11, on the other hand, has a truncated elliptical design. The drive cam 9 and the guide cam 11 each have an almost identical shape and approximately the same size, except for the difference that the guide cam 11 is blunted at its end opposite the common axis 16 or axis of rotation. The drive cut-out 10 on the actuation rod 7 is in turn designed like a segment of a circle, namely in relation to the axis or axis of rotation 16. In contrast, the guide cut-out 12 has a lenticular shape.

Based on the two different views in FIG. 2A and FIG. 2B and a comparative view, it can be seen that the two cut-outs 10, 12 on the actuation rod 7 are also arranged and oriented at an acute angle to one another. This becomes clear if you look at the symmetry axes drawn here in accordance with the representation in FIG. 2B and the corresponding acute angle β enclosed by the symmetry axes. In fact, an acute angle β of approximately 20° to 60° is observed at this location.

A comparison of FIGS. 1 and 2A, 2B makes it clear that the two cut-outs 10, 12 are arranged in different planes, namely a guide plane on the one hand and a drive plane with overlap on the other. In contrast, the two cams 9, 11 are axially identical and firmly connected to one another and, according to the exemplary embodiment, together with the associated drive wheel 15, define the one-piece or one-piece plastic component 9, 11, 15. FIG. 2A shows a 30 rear view of the drive wheel 15 as shown in FIG. 1, while FIG. 2B shows the corresponding front view.

Depending on the rotary movement of the drive wheel 15, the electromotive drive 1 to 15 can now act on the actuation rod 7 to lift the pawl 3 from its latching engagement with the catch 4. As a result, the locking bolt caught by the catch 4 is released and the associated motor vehicle door can be opened. The motor vehicle latch in question has been opened electrically in this manner.

LIST OF REFERENCE NUMBERS

Latch housing 1, 2
Drying room housing part 1
Wet room housing part 2
Locking mechanism 3, 4
Pawl 3
Pivot 3*a*
Catch 4
Dividing wall 5
Through-opening 6
Electromotive drive 7, 8, 9, 10, 11, 12, 13, 14, 15
Actuating rod 7
Cantilever 8
Plastic component 9, 11, 15
Drive cam 9
Drive cut-out 10
Guide cam 11
Guide cut-out 12
Electric motor 13
Drive shaft/worm 14
Evoloid gear stage 14*a*, 15*a*
Evoloid teeth 15*a*, 14*a*
Drive wheel 15
Axis of rotation 16
Angle α
Angle β

The invention claimed is:

1. A drive unit for motor-vehicle applications comprising:
an electromotive drive,
an actuation rod mounted at one end on the electromotive drive and acted upon by the electromotive drive, wherein the electromotive drive operates eccentrically on the actuation rod whereby a drive cam of the electromotive drive engages in a drive cut-out in the actuation rod, and
a guide cam engaging in a guide cut-out in the actuation rod,
wherein the drive cam and the guide cam are arranged on a drive wheel of the electromotive drive, and wherein the electromotive drive has an evoloid gear stage,
wherein the guide cam and the drive cam are positioned at an acute angle to one another and with a common axis of rotation, wherein a symmetry axis of the drive cut-out and a symmetry axis of the guide cut-out are positioned at a second arcuate angle to one another, and wherein the drive cam has an elliptical shape and the guide cam has a truncated elliptical shape.

2. The drive unit according to claim 1, wherein the electromotive drive further includes an electric motor having a drive shaft, and the evoloid gear stage is implemented between a worm on the drive shaft of the electric motor and the drive wheel.

3. The drive unit according to claim 1, wherein the drive wheel has evoloid teeth inclined on an outer circumference relative to an axis of rotation of the drive wheel.

4. The drive unit according to claim 3, wherein a worm has a plurality of evoloid teeth which are bevelled in such a manner that at least one evoloid tooth always is in engagement with the outer circumferential evoloid toothing of the drive wheel.

5. The drive unit according to claim 2, wherein the worm is equipped with a maximum of three evoloid teeth on a circumferential side and in a longitudinal extension of the worm.

6. The drive unit according to claim 1, wherein the guide cam, the drive cam, and the drive wheel are a one-piece plastic component.

7. The drive unit according to claim 2, wherein the worm and the actuation rod each is a plastic component.

8. The drive unit according to claim 1, further comprising a drive housing that includes a dry room housing part, wherein the electromotive drive is arranged at least in part in the dry room housing part of the drive housing.

9. A motor vehicle latch comprising a locking mechanism that includes a catch and a pawl, and a drive unit according to claim 1, wherein the actuation rod acts directly or indirectly on the pawl.

10. The drive unit according to claim 1, wherein the acute angle is from 20° to 60°.

11. The drive unit according to claim 1, wherein drive cut-out has a segment of a circle shape and the guide cut-out has a lenticular shape.

12. The drive unit according to claim 11, wherein the drive cut-out and the guide cut-out are positioned in different planes.

13. The motor vehicle latch according to claim 9, wherein the electromotive drive further includes a cantilever connected to an end of the actuation rod that engages with the pawl.

14. A motor vehicle latch comprising a locking mechanism that includes a catch and a pawl, and a drive unit according to claim 8, wherein the actuation rod acts directly or indirectly on the pawl, and wherein the drive housing further includes a wet room housing part that houses the locking mechanism.

15. The motor vehicle latch according to claim 14, wherein the dry room housing part and the wet room housing part are separated by a dividing wall including a hole through which the actuation rod extends.

16. The motor vehicle latch according to claim 14, wherein the electromotive drive further includes a cantilever connected to an end of the actuation rod that engages with the pawl.

17. A drive unit for motor-vehicle applications comprising:

an electromotive drive, an actuation rod mounted at one end on the electromotive drive and acted upon by the electromotive drive, wherein the electromotive drive operates eccentrically on the actuation rod whereby a drive cam of the electromotive drive engages in a drive cut-out in the actuation rod, and a guide cam engaging in a guide cut-out in the actuation rod, wherein the drive cam and the guide cam are arranged on a drive wheel of the electromotive drive, and wherein the electromotive drive has an evoloid gear stage, wherein the guide cam and the drive cam are positioned at an acute angle to one another and with a common axis of rotation, and wherein the drive cam has an elliptical shape and the guide cam has a truncated elliptical shape.

18. The drive unit according to claim 17, wherein drive cut-out has a segment of a circle shape and the guide cut-out has a lenticular shape.

19. A motor vehicle latch comprising a locking mechanism that includes a catch and a pawl, and a drive unit, wherein the drive unit comprises:

an electromotive drive, an actuation rod mounted at one end on the electromotive drive and acted upon by the electromotive drive, wherein the electromotive drive operates eccentrically on the actuation rod whereby a drive cam of the electromotive drive engages in a drive cut-out in the actuation rod, and a guide cam engaging in a guide cut-out in the actuation rod, wherein the drive cam and the guide cam are arranged on a drive wheel of the electromotive drive, and wherein the electromotive drive has an evoloid gear stage, wherein the actuation rod acts directly or indirectly on the pawl, wherein the electromotive drive further includes a cantilever connected to an end of the actuation rod that engages with the pawl.

* * * * *